US010690485B2

(12) United States Patent
Koester et al.

(10) Patent No.: US 10,690,485 B2
(45) Date of Patent: Jun. 23, 2020

(54) SYSTEM AND METHOD FOR DETERMINING TOW PARAMETERS

(71) Applicant: Vanderbilt University, Nashville, TN (US)

(72) Inventors: David J. Koester, Nashville, TN (US); Douglas Adams, Brentwood, TN (US); Raymond Martin Bond, Nashville, TN (US); Garrett W. Thorne, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 49 days.

(21) Appl. No.: 15/920,187

(22) Filed: Mar. 13, 2018

(65) Prior Publication Data

US 2018/0266811 A1    Sep. 20, 2018

Related U.S. Application Data

(60) Provisional application No. 62/471,209, filed on Mar. 14, 2017.

(51) Int. Cl.
*G01B 11/24* (2006.01)
*G01B 11/06* (2006.01)
(Continued)

(52) U.S. Cl.
CPC .............. *G01B 11/24* (2013.01); *G01B 11/02* (2013.01); *G01B 11/046* (2013.01); *G01B 11/06* (2013.01);
(Continued)

(58) Field of Classification Search
CPC ....................................................... G01B 11/24
(Continued)

(56) References Cited

U.S. PATENT DOCUMENTS 5,057,338 A * 10/1991 Baucom ................. B05O 19/02
    118/DIG. 5
5,123,373 A *  6/1992 Iyer ........................... B05O 9/14
    118/309

(Continued)

FOREIGN PATENT DOCUMENTS

CN    200947079 Y    9/2007
CN    203148713 U    8/2013
(Continued)

*Primary Examiner* — Tarifur R Chowdhury
*Assistant Examiner* — Omar H Nixon
(74) *Attorney, Agent, or Firm* — Michael Best & Friedrich LLP (57) ABSTRACT

A system for determining one or more characteristics of a carbon fiber tow. The system including a first laser profilometer, a second laser profilometer, and a controller. The first laser profilometer is located on a first side of the carbon fiber tow. The second laser profilometer is located on a second side of the carbon fiber tow. The controller is configured to receive, from the first profilometer, a first profile of the first side of the carbon fiber tow, and receive, from the second profilometer, a second profile of the second side of the carbon fiber tow. The controller is further configured to determine at least one characteristic selected from a group consisting of a tow width of the carbon fiber tow, a tow fuzz of the carbon fiber tow, a tow thickness of the carbon fiber tow, and a tow angle of the carbon fiber tow, the at least one characteristic based on the first profile and the second profile. The controller further configured to output the at least one characteristic of the carbon fiber tow.

20 Claims, 9 Drawing Sheets

(51) Int. Cl.
    *G01B 11/26*     (2006.01)
    *G01N 21/952*     (2006.01)
    *G01B 11/02*     (2006.01)
    *G01B 11/04*     (2006.01)
    *G01N 21/89*     (2006.01)

(52) U.S. Cl.
    CPC ......... *G01B 11/26* (2013.01); *G01N 21/8914* (2013.01); *G01N 21/8915* (2013.01); *G01N 21/952* (2013.01); *G01B 2210/44* (2013.01)

(58) Field of Classification Search
    USPC ......................................................... 356/601
    See application file for complete search history.

(56) References Cited

U.S. PATENT DOCUMENTS

| | | | | |
|---|---|---|---|---|
| 5,296,064 | A * | 3/1994 | Muzzy | B29O 70/20 156/166 |
| 5,436,980 | A * | 7/1995 | Weeks | B29O 70/28 356/36 |
| 5,710,432 | A | 1/1998 | Bell | |
| 2007/0230721 | A1 * | 10/2007 | White | H04R 19/005 381/166 |
| 2007/0272563 | A1 * | 11/2007 | Petyt | C12Q 1/001 205/777.5 |
| 2012/0086566 | A1 * | 4/2012 | Carney | B29D 30/54 340/443 |
| 2014/0009599 | A1 * | 1/2014 | Ledford | H04N 7/18 348/86 |
| 2014/0069893 | A1 * | 3/2014 | Bruck | B23P 6/007 219/76.14 |
| 2015/0251213 | A1 * | 9/2015 | Birmingham | B22F 3/1055 427/475 |
| 2016/0322306 | A1 * | 11/2016 | Roesner | H01L 23/544 |
| 2016/0332389 | A1 * | 11/2016 | Tachon | B32B 5/022 |
| 2018/0266929 | A1 | 9/2018 | Koester et al. | |

FOREIGN PATENT DOCUMENTS

| | | |
|---|---|---|
| CN | 203908901 U | 10/2014 |
| CN | 205403670 U | 7/2016 |
| CN | 205748285 U | 11/2016 |
| JP | 2004294186 A | 10/2004 |
| JP | 2006265791 A | 10/2006 |
| KR | 20120077537 A | 7/2012 |

* cited by examiner

SYSTEM AND METHOD FOR DETERMINING TOW PARAMETERS

RELATED APPLICATIONS

This application claims priority to U.S. Provisional Patent Application No. 62/471,209, filed Mar. 14, 2017, the entire contents of which are hereby incorporated by reference.

STATEMENT OF GOVERNMENT INTEREST

This application was made with government support under DE-EE0006926 awarded by the Department of Energy. The government has certain rights to this application.

FIELD

Embodiments relate to determining one or more characteristics of carbon fiber, and more specifically, carbon fiber tow.

SUMMARY

One or more characteristics of carbon fiber tow may include a tow width and a tow fuzz. Tow width may refer to a width of a carbon fiber tow. Tow fuzz may refer to the presence of broken fiber of a surface of the carbon fiber tow. Both tow width and tow fuzz may be used to determine a quality of a carbon fiber tow.

Thus, one embodiment provides a system for determining one or more characteristics of a carbon fiber tow. The system includes a first laser profilometer, a second laser profilometer, and a controller. The first laser profilometer is located on a first side of the carbon fiber tow. The second laser profilometer is located on a second side of the carbon fiber tow. The controller includes an electronic processor and a memory. The controller is communicatively coupled to the first and second laser profilometers. The controller is configured to receive, from the first profilometer, a first profile of the first side of the carbon fiber tow, and receive, from the second profilometer, a second profile of the second side of the carbon fiber tow. The controller is further configured to determine at least one characteristic selected from a group consisting of a tow width of the carbon fiber tow, a tow fuzz of the carbon fiber tow, a tow thickness of the carbon fiber tow, and a tow angle of the carbon fiber tow, the at least one characteristic based on the first profile and the second profile. The controller further configured to output the at least one characteristic of the carbon fiber tow.

Another embodiment provides a method of determining one or more characteristics of a carbon fiber tow. The method includes sensing, via a first laser profilometer located on a first side of the carbon fiber tow, a first profile of the carbon fiber tow, and sensing, via a second laser profilometer located on a second side of the carbon fiber tow, a second profile of the carbon fiber tow. The method further includes determining, via a controller, at least one characteristic selected from a group consisting of a tow width of the carbon fiber tow, a tow fuzz of the carbon fiber tow, a tow thickness of the carbon fiber tow, and a tow angle of the carbon fiber tow, the at least one characteristic based on the first profile and the second profile, an outputting the at least one characteristic of the carbon fiber tow.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
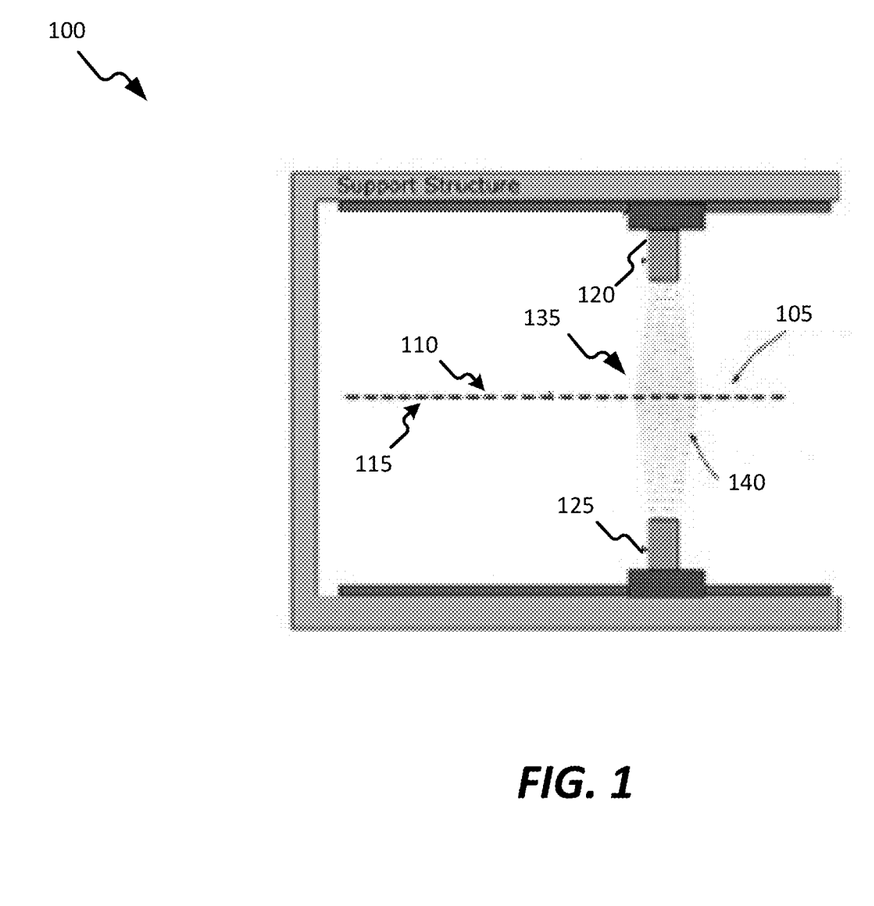
FIG. 1 is a front view of a system configured to determine one or more characteristics of a carbon fiber tow according to some embodiments.
Figure 2:
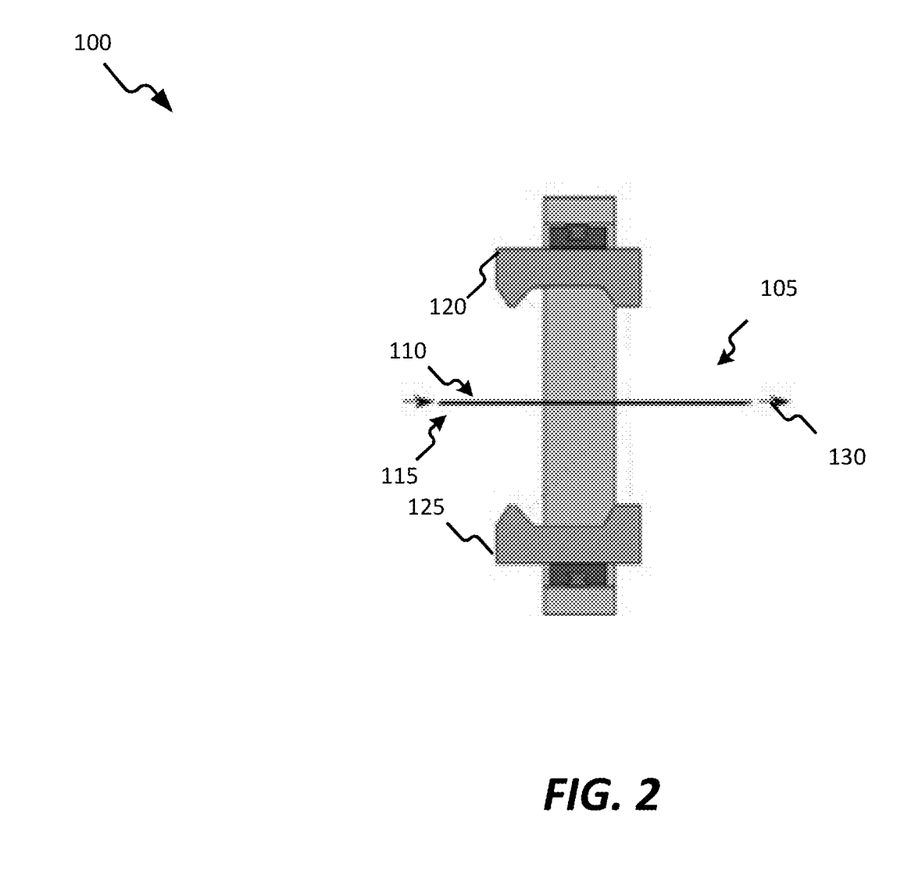
FIG. 2 is a side view of the system of FIG. 1 according to some embodiments.
Figure 3:
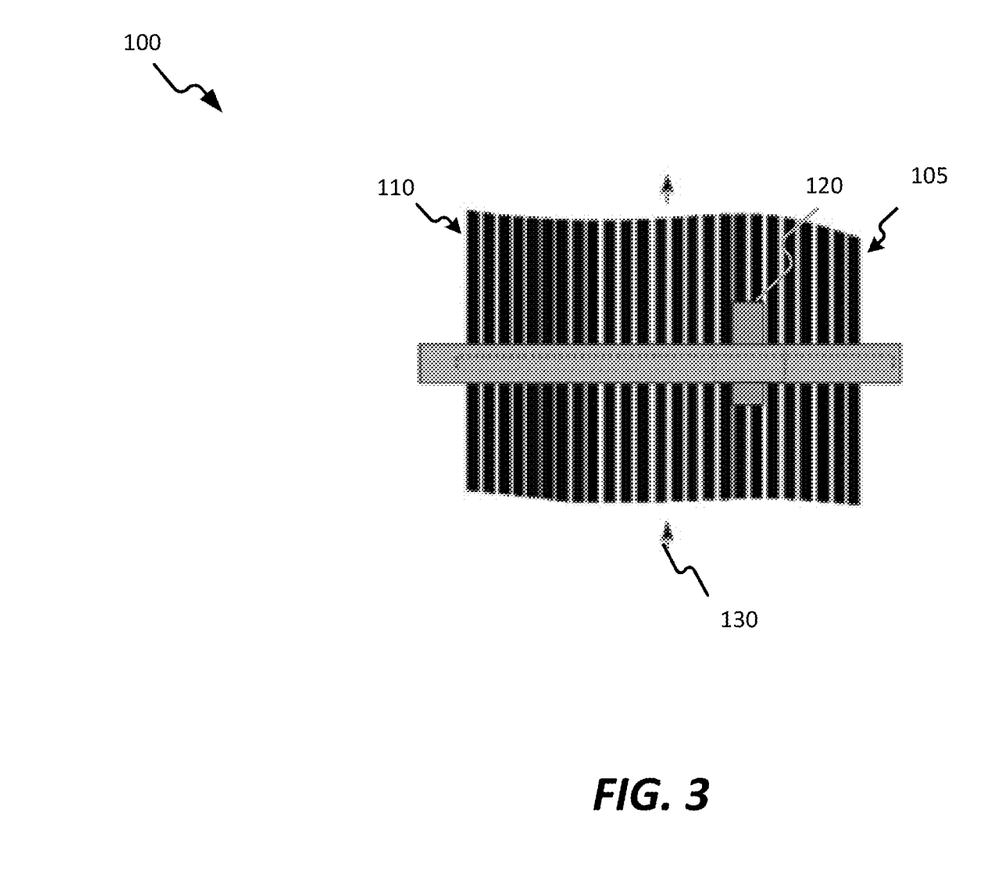
FIG. 3 is a top view of the system of FIG. 1 according to some embodiments.

FIGS. 1-3 illustrate a system 100 according to some embodiments, the system 100 is configured to determine one or more characteristics of a carbon fiber tow 105 having a first side 110 and a second side 115. In some embodiments, the one or more characteristics include, but are not limited to, a tow width, a tow fuzz, a tow thickness, and a tow angle (for example, twisting of carbon fiber tow 105).

The system 100 may include a first sensor 120 and a second sensor 125. The first and second sensors 120, 125 may be profilometers (for example, laser profilometers). In such an embodiment, the first and second sensors 120, 125 are configured to measure the first and second surfaces, 110, 115, respectively, of the carbon fiber tow 105. For example, the first and second sensors 120, 125 may be configured to sense displacement of the carbon fiber tow 105 in an X-direction and a Y-direction. Additionally, the first and second sensors 120, 125 may be configured to sense displacement of the carbon fiber tow 105 at various locations (for example, two or more points of the first side 110 and two or more points of the second side 115).

In operation, the carbon fiber tow 105 moves past the first and second sensors 120, 125 in a direction illustrated by arrow 130. As the carbon fiber tow 105 moves, the first sensor 120 outputs a first signal 135 toward the first surface 110 (for example, a top surface), while the second sensor 125 outputs a second signal 140 toward the second surface 115 (for example, a bottom surface). In some embodiments, the first and second signals 135, 140 may be images of the first and second surfaces 110, 115, respectively. By using the first sensor 120 and the second sensor 125, a full shape outline of the carbon fiber tow 105 may be sensed. In some embodiments, the first and second sensors 120, 125 do not influence each other.

Figure 4:
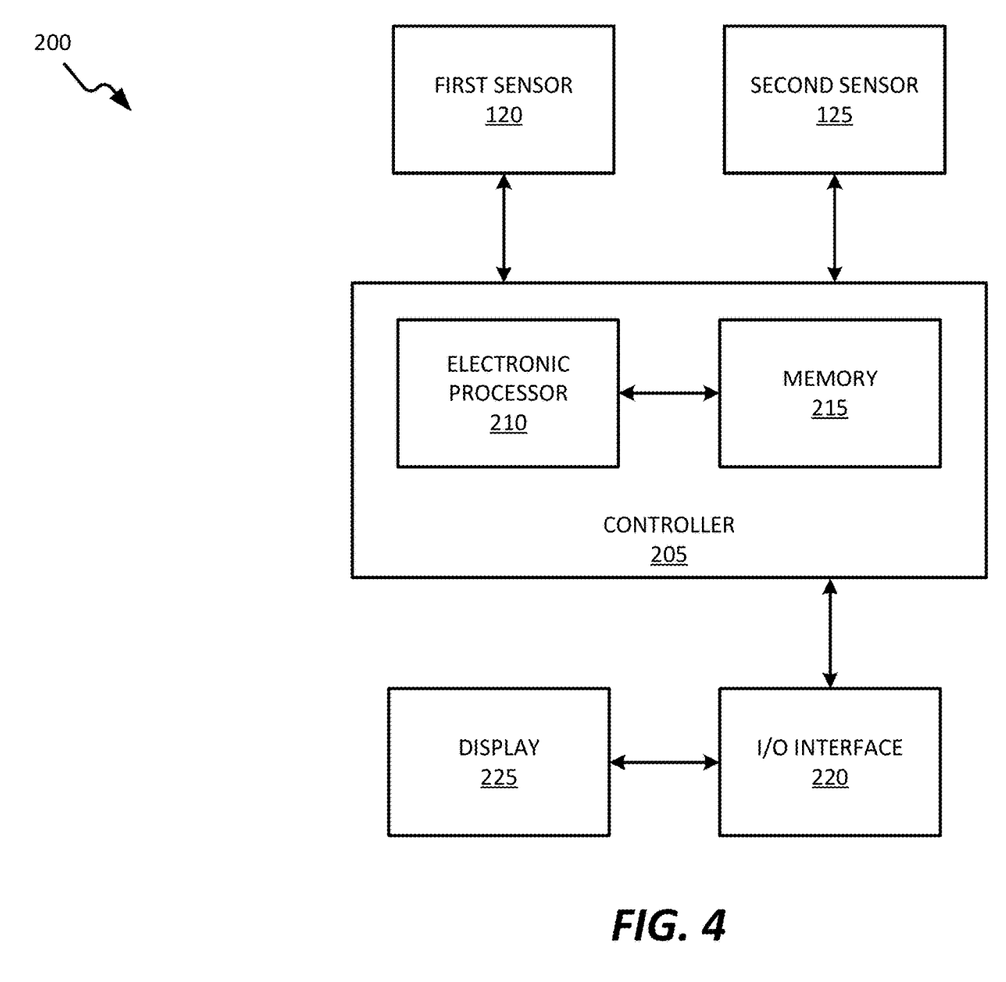
FIG. 4 is a block diagram of a control system of the system of FIG. 1 according to some embodiments.

FIG. 4 is a block diagram illustrating a control system 200 of the system 100 according to some embodiments. The control system 200 is configured to control operation of the system 100. The control system 200 includes a controller 205 that is electrically and/or communicatively connected to a variety of modules or components of the system 100. For example, the controller 205 is electrically and/or communicatively connected to the first and second sensors 120, 125.

In some embodiments, the controller 205 includes a plurality of electrical and electronic components that provide power, operational control, and protection to the components and modules within the controller 205 and/or the system 100. For example, the controller 205 includes, among other things, an electronic processor 210 (for example, a microprocessor or another suitable programmable device) and the memory 215.

The memory 215 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 210 is communicatively coupled to the memory 215 and executes software instructions that are stored in the memory 215, or stored on another non-transitory computer readable medium such as another memory or a disc. The software may include one or more applications, program data, filters, rules, one or more program modules, and other executable instructions.

In some embodiments, the control system 200 further includes an input/output (I/O) interface 220. The I/O interface 220 provides an interface between system 100 and external devices (for example, a display 225, an external computer, a network, a smartphone, etc.).

In operation, the controller 205 receives a first signal from the first sensor 120 corresponding to a first profile of the first surface 110 and a second signal from the second sensor 125 corresponding to a second profile of the second surface 115. In some embodiments, the first and second profiles are used to form a profile representation. The controller 205 may then determine a tow width and/or a tow fuzz of the carbon fiber tow 105 based on the profile representation. In such an embodiment, the profile representation may be converted to binary by the controller 205. Additionally, in such an embodiment, the profile representation may be filtered (for example, using a high-pass filter) to determine the tow width and/or tow fuzz.

Figure 5:
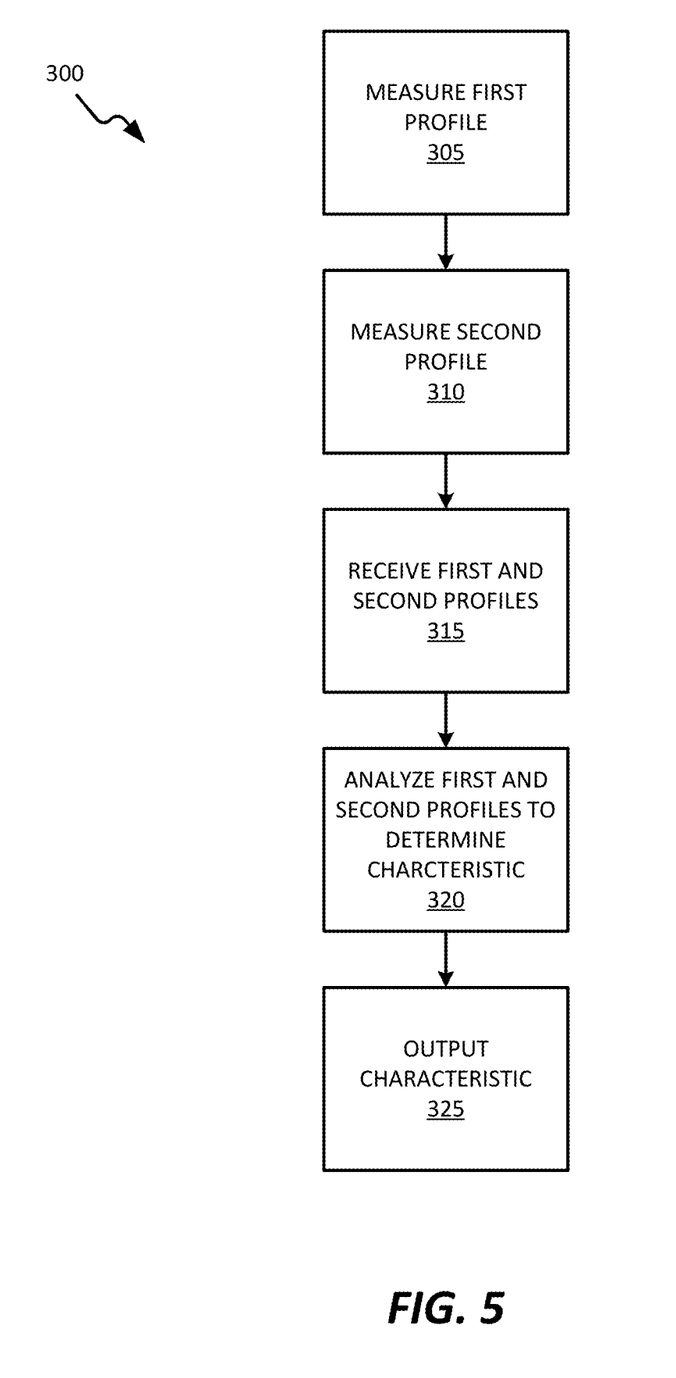
FIG. 5 is a flowchart illustrating a process of the system of FIG. 1 according to some embodiments.

FIG. 5 is a flowchart illustrating an operation, or process, 300 of the system 100 according to some embodiments. It should be understood that the order of the steps disclosed in process 300 could vary. In addition, other steps may be added and not all of the steps may be required. The first sensor 120 (for example, a first laser profilometer) measures a first profile of a first surface 110 (for example, a top surface) of the carbon fiber tow 105 (block 305). The second sensor 125 (for example, a second laser profilometer) measures a second profile of a second surface 115 (for example, a bottom surface) of the carbon fiber tow 105 (block 310). The controller 205 receives the first and second profiles (block 315).

Figure 6:
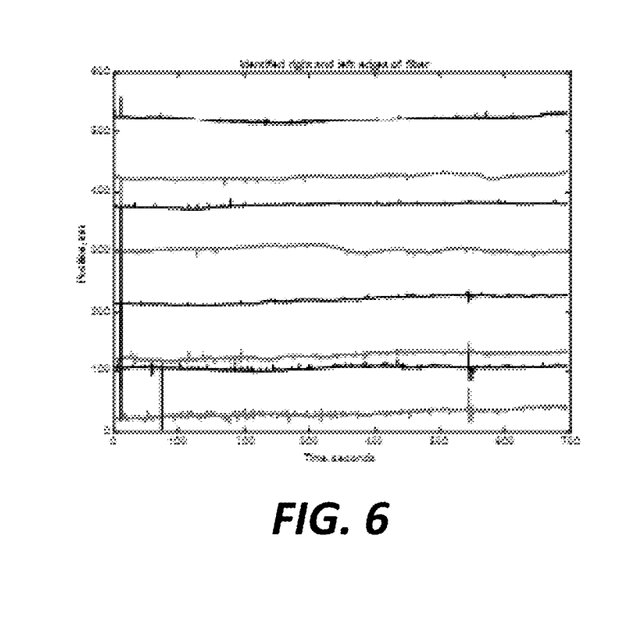
FIG. 6 is a chart illustrating tow edges determined through data processing according to some embodiments.

The controller 205 analyzes the first and second profiles and determines one or more characteristics of the carbon fiber tow 105 (block 320). In some embodiments, the one or more characteristics include a tow width, a tow fuzz, a tow thickness, and/or a tow angle, of the carbon fiber tow 105. In some embodiments, the controller 205 analyzes the first and second profiles by converting the first profile to a binary matrix, wherein a 1 is a measurement indicative of the presence of fibers, and a 0 is a measurement indicative of no fibers present. A binary OR operation between the first and second sensors 120, 125 may then be used. Additionally, a binary AND operation between four consecutive measurements may also be used. The binary OR operation and/or the binary AND operation may be used to reduce the effect of drop-outs, while ensuring that stray fibers do not have an undue effect on a tow width estimation. As illustrated in FIG. 6, once the binary operations are performed, the edges of the carbon fiber tow 105 may be identified, and the tow width may be determined by determining a difference between a horizontal position of each edge of the carbon fiber tow 105.

Figure 7:
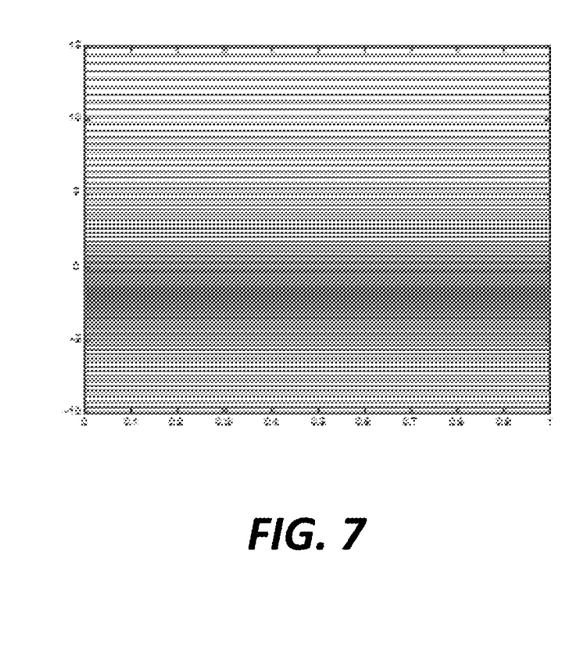
FIG. 7 is a chart illustrating amplitude ranges for entropy calculation according to some embodiments.

The controller 205 may further determine a tow fuzz of the carbon fiber tow 105 by performing a qualitative assessment of stray fibers detected by the first and second sensors 120, 125. In some embodiments, an entropy-based method of quantifying the level of fuzz present may also be used. In some embodiments, Shannon Entropy may be used to quantify the level of fuzz. In such an embodiment, a filter (for example, a high-pass filter) may be used to eliminate frequency (for example, low frequency) variations in a profile (for example, first or second profile). Then, a probability that the amplitude of the profile measurement is within a set of specified ranges may be determined. A number of such specified ranges, and a spacing approach, may also be determined. As illustrated in FIG. 7, the size of the specified ranges may increase with quadratic growth as a function of distance from the mean. Such a second order specified ranges may be used to capture the effects of both stray fibers above the first and/or second surfaces 110, 115 of the carbon fiber tow 105, as well as broken fibers that are close to the first and/or second surfaces 110, 115 of the carbon fiber tow 105. The entropy at each position along the width of the carbon fiber tow 105 may be calculated, and the mean of the entropy values be determined, to quantity a level of tow fuzz of the carbon fiber tow 105. The controller 205 may then output the one or more characteristics of the carbon fiber tow 105 (block 325).

In some embodiments, the controller 205 may identify a variation of tow fuzz over time. In some embodiments, the controller 205 may split one or more profile time histories into segments centered at a predetermined point in time. An entropy calculation (for example, entropy calculation discussed above) may then be performed on the segments.

Figure 8:
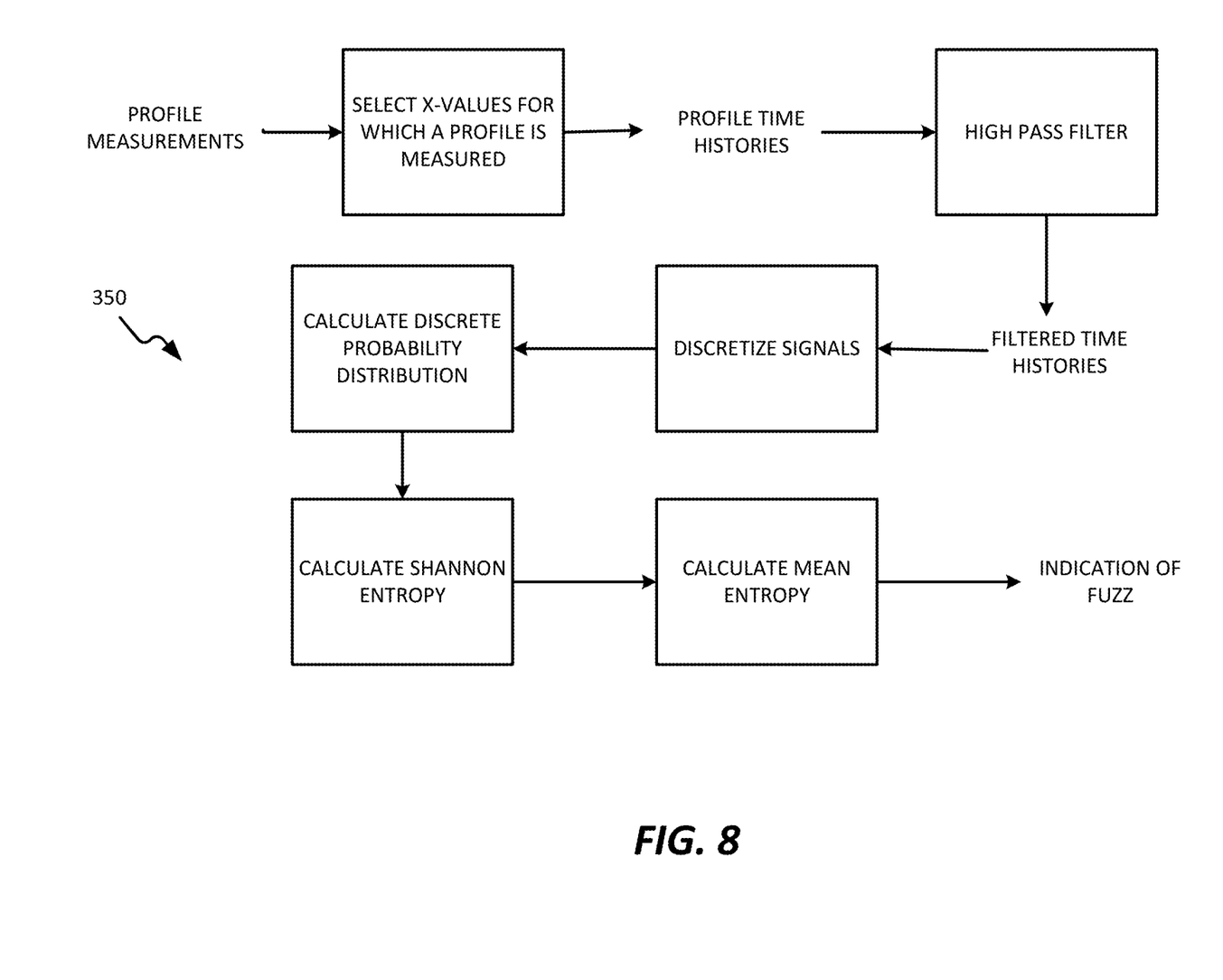
FIG. 8 is a block diagram illustrating an algorithm of operation of the system of FIG. 1 according to some embodiments.

FIG. 8 is a block diagram illustrating a fuzz estimation algorithm 350. Initially, x-values of profile measurements are selected, resulting in profile time histories. The profile time histories are filtered (for example, using a high-pass filter), resulting in filtered time histories. The filtered time histories are discretized based on amplitude ranges. For each discretized signal, a discrete probability distribution is calculated for each possible amplitude level. A Shannon entropy is then calculated for each signal using discrete probability distributions. A mean entropy is then calculated, resulting in an indication of the fuzz of the carbon fiber tow 105.

Figure 9:
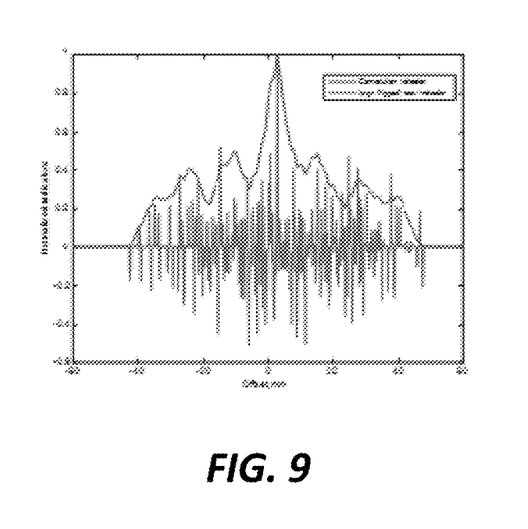
FIG. 9 is a chart illustrating normalized functions of the system of FIG. 1 according to some embodiments.
Figure 10:
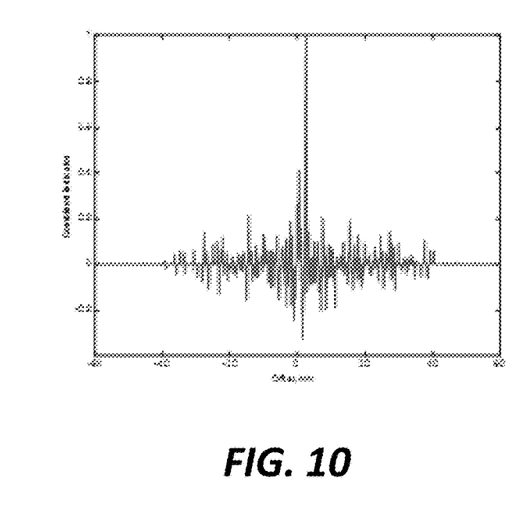
FIG. 10 is a chart illustrating a combined function of the system of FIG. 1 according to some embodiments.
Figure 11:
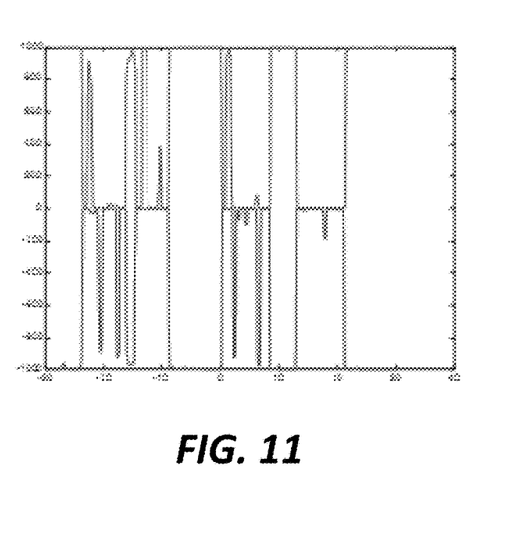
FIG. 11 is a chart illustrating aligned profiles of the system of FIG. 1 according to some embodiments.

In some embodiments, the controller 205 may further be configured to identify an offset between the first and second sensors 120, 125. In such an embodiment, the controller 205 will perform an offset function. As illustrated in FIG. 9, in some embodiments, the offset function is the product of two normalized functions. In such an embodiment, the first function may be a convolution integral between the first and second sensors 120, 125. Such a first function may reach a peak that is indicative of the offset, which results in the most overlap between the two measurements. The second function may be a cross correlation between the derivatives of a first profile and a second profile with respect to a position along the width of the carbon fiber two 105. As illustrated in FIG. 10, the first and second functions may be combined by normalizing each function by their respective maximum values. The normalized functions may then be multiplied. As illustrated in FIG. 11, an offset corresponding to a peak of the multiplied normalized functions may represent the offset between the first and second sensors 120, 125.

Figure 12:
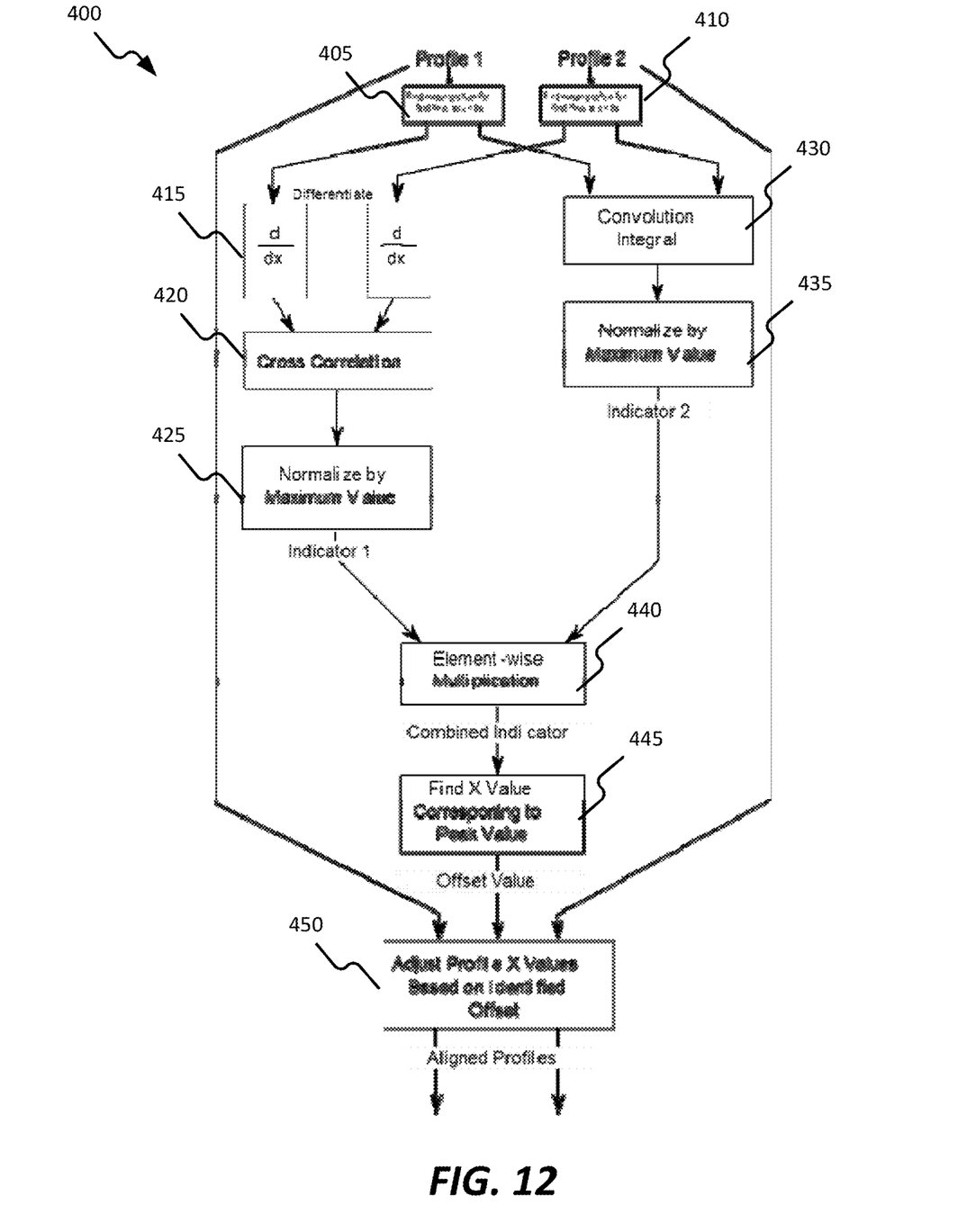
FIG. 12 is a flowchart illustrating a tow fuzz estimation algorithm of the system of FIG. 1 according to some embodiments.

FIG. 12 is a flowchart illustrating an operation, or process, 400 of the system 100 according to some embodiments. It should be understood that the order of the steps disclosed in process 400 could vary. In addition, other steps may be added and not all of the steps may be required. A first mean profile for the first profile is calculated (block 405). A second mean profile for the second profile is calculated (block 410). The first and second mean profiles may be differentiated (blocks 415), and the differentiated signal may be cross-correlated (block 420). The cross-correlated signals may then be normalized (block 425). The first and second mean profiles may also be integrated (block 430). The integrated signals may then be normalized (block 435). The two normalized signals may then be multiplied (block 440). An x-value corresponding to a peak value of the multiplied signal may then be found (block 445). In some embodiments, the x-value is representative of an offset value. The x-value may then be used to adjust profile x-values (block 450).

Thus, the application provides, among other things, a system and method for determining a tow width and/or a tow fuzz of a carbon fiber tow. Various features and advantages of the application are set forth in the following claims.

What is claimed is:

1. A system for determining one or more characteristics of a carbon fiber tow, the system comprising:
a first laser profilometer located on a first side of the carbon fiber tow;
a second laser profilometer located on a second side of the carbon fiber tow;
a controller including an electronic processor and a memory, the controller communicatively coupled to the first and second laser profilometer, the controller configured to
receive, from the first profilometer, a first profile of the first side of the carbon fiber tow,
receive, from the second profilometer, a second profile of the second side of the carbon fiber tow,
determine at least one characteristic selected from a group consisting of a tow width of the carbon fiber tow, a tow fuzz of the carbon fiber tow, a tow thickness of the carbon fiber tow, and a tow angle of the carbon fiber tow, the characteristic based on the first profile and the second profile, and
output the at least one characteristic of the carbon fiber tow.

2. The system of claim 1, wherein the first and second profiles form a profile representation.

3. The system of claim 2, wherein the profile representation is converted to a binary matrix.

4. The system of claim 2, wherein the profile representation is filtered.

5. The system of claim 4, wherein the profile representation is filtered via a high-pass filter.

6. The system of claim 1, wherein the controller is further configured to:
determine a variation of fuzz with time.

7. The system of claim 1, wherein the controller is further configured to:
identify an offset between the first laser profilometer and the second laser profilometer.

8. The system of claim 7, wherein the controller is further configured to:
perform an offset function.

9. The system of claim 8, wherein the offset function includes a product of two normalized functions.

10. The system of claim 1, wherein the controller is configured to:
determine, via an entropy-based method, a tow fuzz of the carbon fiber tow.

11. A method of determining one or more characteristics of a carbon fiber tow, the method comprising:
sensing, via a first laser profilometer located on a first side of the carbon fiber tow, a first profile of the carbon fiber tow;
sensing, via a second laser profilometer located on a second side of the carbon fiber tow, a second profile of the carbon fiber tow;
determining, via a controller, at least one characteristic selected from a group consisting of a tow width of the carbon fiber tow, a tow fuzz of the carbon fiber tow, a tow thickness of the carbon fiber tow, and a tow angle of the carbon fiber tow, the at least one characteristic based on the first profile and the second profile; and
outputting the at least one characteristic of the carbon fiber tow.

12. The method of claim 11, wherein the first and second profiles form a profile representation.

13. The method of claim 12, wherein the profile representation is converted to a binary matrix.

14. The method of claim 12, wherein the profile representation is filtered.

15. The method of claim 14, wherein the profile representation is filtered via a high-pass filter.

16. The method of claim 11, further comprising:
determining, via the controller, a variation of fuzz with time.

17. The method of claim 11, wherein the controller is further configured to:
identifying, via the controller, an offset between the first laser profilometer and the second laser profilometer.

18. The method of claim 17, further comprising:
performing, via the controller, an offset function.

19. The method of claim 18, wherein the offset function includes a product of two normalized functions.

20. The method of claim 11, further comprising:
determining, via an entropy-based method, a tow fuzz of the carbon fiber tow.

\* \* \* \* \*